/

US008650023B2

(12) United States Patent
Brun

(10) Patent No.: US 8,650,023 B2
(45) Date of Patent: Feb. 11, 2014

(54) CUSTOMER REVIEW AUTHORING ASSISTANT

(75) Inventor: Caroline Brun, Grenoble (FR)

(73) Assignee: Xerox Corporation, Norwalk, CT (US)

(*) Notice: Subject to any disclaimer, the term of this patent is extended or adjusted under 35 U.S.C. 154(b) by 270 days.

(21) Appl. No.: 13/052,774

(22) Filed: Mar. 21, 2011

(65) Prior Publication Data
US 2012/0245924 A1 Sep. 27, 2012

(51) Int. Cl.
G06F 17/27 (2006.01)

(52) U.S. Cl.
USPC ..................... 704/9; 704/1; 704/10

(58) Field of Classification Search
USPC ...................................... 704/1–10
See application file for complete search history.

(56) References Cited

U.S. PATENT DOCUMENTS

| 7,058,567 | B2 | 6/2006 | Aït-Mokhtar et al. |
| 7,624,102 | B2* | 11/2009 | Watson ................ 1/1 |
| 8,280,885 | B2* | 10/2012 | Cardie et al. ........... 707/737 |
| 2004/0158454 | A1 | 8/2004 | Polanyi et al. |
| 2004/0225577 | A1* | 11/2004 | Robinson ............... 705/26 |
| 2007/0276871 | A1* | 11/2007 | Fu et al. .............. 707/104.1 |
| 2008/0071519 | A1 | 3/2008 | Brun |
| 2008/0215571 | A1* | 9/2008 | Huang et al. ............. 707/5 |
| 2008/0319978 | A1 | 12/2008 | Brun et al. |
| 2008/0320568 | A1* | 12/2008 | Hawkins et al. ............ 726/5 |
| 2009/0077069 | A1 | 3/2009 | Polanyi et al. |
| 2009/0193328 | A1* | 7/2009 | Reis et al. ............. 715/231 |
| 2009/0204596 | A1 | 8/2009 | Brun et al. |
| 2009/0265304 | A1 | 10/2009 | Aït-Mokhtar et al. |
| 2009/0306967 | A1* | 12/2009 | Nicolov et al. ............. 704/9 |
| 2010/0004925 | A1 | 1/2010 | Ah-Pine et al. |
| 2010/0023311 | A1* | 1/2010 | Subrahmanian et al. ......... 704/2 |
| 2010/0082331 | A1 | 4/2010 | Brun et al. |
| 2011/0040759 | A1* | 2/2011 | Rappoport et al. ........... 707/737 |
| 2011/0173191 | A1* | 7/2011 | Tsaparas et al. ............ 707/723 |

FOREIGN PATENT DOCUMENTS

WO    WO 2006086053 A2 *  8/2006

OTHER PUBLICATIONS

Turney, P. D. (Jul. 2002). Thumbs up or thumbs down?: semantic orientation applied to unsupervised classification of reviews. In Proceedings of the 40th Annual Meeting on Association for Computational Linguistics (pp. 417-424). Association for Computational Linguistics.*

Fahrni, A., & Klenner, M. (Apr. 2008). Old wine or warm beer: Target-specific sentiment analysis of adjectives. In Proceedings of the symposium on affective language in human and machine, AISB 2008 convention (pp. 60-63).*

(Continued)

Primary Examiner — Douglas Godbold
Assistant Examiner — Ernest Estes
(74) Attorney, Agent, or Firm — Fay Sharpe LLP

(57) ABSTRACT

An authoring assistant includes a parser which automatically identifies opinion expressions in input text. The text may include an author's review of an item, such as a product or service. A computer-implemented opinion review component generates an analysis of the text, which is based on the identified opinion expressions. The opinion review component computes an effective opinion of the text as a function of a measure of polarity associated with the identified opinion expressions. A representation generator generates a representation of the analysis for display on an associated user interface. The representation of the analysis includes a representation of the effective opinion. In the case of a review, the authoring assistant may allow the author to modify the review to reduce incoherence with a rating of the item.

28 Claims, 6 Drawing Sheets

(56) References Cited

OTHER PUBLICATIONS

Liu, J., & Seneff, S. (Aug. 2009). Review sentiment scoring via a parse-and-paraphrase paradigm. In Proceedings of the 2009 Conference on Empirical Methods in Natural Language Processing: vol. 1-vol. 1 (pp. 161-169). Association for Computational Linguistics.*

Liu, B. (2010). Sentiment analysis and subjectivity. Handbook of Natural Language Processing, 627-666.*

Hu, M., & Liu, B. (Aug. 2004). Mining and summarizing customer reviews. In Proceedings of the tenth ACM SIGKDD international conference on Knowledge discovery and data mining (pp. 168-177). ACM.*

Hu, et al. "Mining and Summarizing Customer Reviews," KDD'04, Aug. 22-25, 2004.

Kim, et al. "Determining the Sentiment of Opinions," Proceedings of the COLING conference, Geneva, 2004.

Mullen, et al. "Sentiment analysis using support vector machines with diverse information sources," in Proceedings of EMNLP 2004 (Jul. 2004), pp. 412-418.

Pang, et al. "Thumbs up?: sentiment classification using machine learning techniques," in Proceedings of the ACL-02 conference on Empirical Methods in Natural Language Processing, vol. 10, 79-86, 2002.

Yu, et al. "Towards Answering Opinion Questions: Separating Facts from Opinions and Identifying the Polarity of Opinion Sentences," Proceedings of the 2003 Conference on Empirical Methods in Natural Language Processing, (EMNLP 2003). Sapporo, Japan. Jul. 11-12, 2003.

Brun, et al. "Normalization and paraphrasing using symbolic methods" ACL: Second International workshop on Paraphrasing, Paraphrase Acquisition and Applications, Sapporo, Japan, Jul. 7-12, 2003.

U.S. Appl. No. 13/052,686, filed Mar. 21, 2011, Brun.

U.S. Appl. No. 13/037,450, filed Mar. 1, 2011, Brun, et al.

Aït-Mokhtar, et al., "Robustness beyond Shallowness: Incremental Dependency Parsing," Special Issue of NLE Journal (2002).

Aït-Mokhtar, et al., "Incremental Finite-State Parsing," in *Proc.* 5th Conf. on Applied Natural Language Processing (*ANLP'97*), pp. 72-79 (1997).

Aït-Mokhtar, et al., "Subject and Object Dependency Extraction Using Finite-State Transducers," in Proc. 35th Conf. of the Association for Computational Linguistics (ACL'97) Workshop on Information Extraction and the Building of Lexical Semantic Resources for NLP Applications, pp. 71-77 (1997).

Moghaddam, et al., "Opinion Digger: An Unsupervised Opinion Miner from Unstructured Product Reviews," in Proc. 19th Conf. on Information and Knowledge Management (CIKM'10), Toronto, Oct. 2010.

Agarwal, et al. "Augmenting Wordnet with Polarity Information on Adjectives," 3rd International Wordnet Conference, Jeju Island, Korea, South Jeju (Seogwipo), 2006.

Esuli, et al. SENTIWORDNET: A Publicly Available Lexical Resource for Opinion Mining, in 5th Conference on Language Resources and Evaluation (2006), pp. 417-422.

Vegnaduzzo. "Acquisition of subjective adjectives with limited resources," in Proc. AAAI Spring Symposium on Exploring Attitude and Affect in Text: Theories and Applications, Stanford, US (2004).

Grefenstette. "Comparing Two Language Identification Schemes," Proc. 3rd Intern'l Conf. on the Statistical Analysis of Textual Data (JADT'95), Rome, Italy (1995).

* cited by examiner

CUSTOMER REVIEW AUTHORING ASSISTANT

CROSS REFERENCE TO RELATED PATENTS AND APPLICATIONS

Cross-reference is made to copending application Ser. No. 13/052,686, filed on Mar. 21, 2011, entitled CORPUS-BASED SYSTEM AND METHOD FOR ACQUIRING POLAR ADJECTIVES, by Caroline Brun, the disclosure of which is incorporated herein by reference, in its entirety.

BACKGROUND

The exemplary embodiment relates to opinion mining and finds particular application in connection with an authoring assistant for assisting a user in reducing incoherence between a review and a rating which is intended to capture the overall sentiment of the review.

Opinion mining refers to the determination of the attitude a speaker or a writer with respect to some topic, written in natural language, and is applicable to a wide range of applications involving natural language processing, computational linguistics, and text mining. Opinion mining is of particular interest to businesses seeking to obtain the opinions of customers and other reviewers on their products and services. Opinions are often expressed on social networks, blogs, e-forums, and in dedicated customer feedback pages of company websites.

Opinions are often expressed in natural language text using specific words, which can be considered as having a sentiment which is positive, i.e., indicating that the author has a good opinion of the item that he is writing about, or negative, i.e., that the author has a bad opinion. The words used can include adjectives (beautiful, ugly), verbs (love, hate), nouns (talent, nuisance), and sometimes adverbs (admirably, annoyingly). Each of these pairs includes a positive and a negative example.

An author drafting a review of a particular product or service is often asked to provide an overall rating of that product or service which is intended to capture the author's overall opinion of the item that is being reviewed. The author may post the review on a website for others to see. The author may be unaware that, in some instances, the comments in the review are not reflected in the overall rating, rendering the review incoherent. Readers of the review may thus find it unhelpful or misleading.

The exemplary embodiment provides an authoring assistant which assists an author by providing an analysis of the author's review which can be displayed to the author on a graphical user interface.

INCORPORATION BY REFERENCE

The following references, the disclosures of which are incorporated herein in their entireties by reference, are mentioned.

The following disclose a parser for syntactically analyzing an input text string in which the parser applies a plurality of rules which describe syntactic properties of the language of the input text string: U.S. Pat. No. 7,058,567, issued Jun. 6, 2006, entitled NATURAL LANGUAGE PARSER, by Aït-Mokhtar, et al., and Aït-Mokhtar, et al., "Robustness beyond Shallowness: Incremental Dependency Parsing," Special Issue of NLE Journal (2002); Aft-Mokhtar, et al., "Incremental Finite-State Parsing," in Proc. 5th Conf. on Applied Natural Language Processing (ANLP'97), pp. 72-79 (1997), and Aït-Mokhtar, et al., "Subject and Object Dependency Extraction Using Finite-State Transducers," in Proc. 35th Conf. of the Association for Computational Linguistics (ACL'97) Workshop on Information Extraction and the Building of Lexical Semantic Resources for NLP Applications, pp. 71-77 (1997).

Opinion mining is discussed, for example, in Moghaddam, et al., "Opinion Digger: An Unsupervised Opinion miner from Unstructured Product Reviews," in Proc. 19$^{th}$ Conf. on Information and Knowledge Management (CIKM'10) Toronto, October 2010; U.S. Pub. No. 2009/0265304, published Oct. 22, 2009, entitled METHOD AND SYSTEM FOR RETRIEVING STATEMENTS OF INFORMATION SOURCES AND ASSOCIATING A FACTUALITY ASSESSMENT TO THE STATEMENTS by Aft-Mokhtar, et al., and U.S. Pub. No. 2004/0158454, entitled SYSTEM AND METHOD FOR DYNAMICALLY DETERMINING THE ATTITUDE OF AN AUTHOR OF A NATURAL LANGUAGE DOCUMENT, by Livia Polanyi, et al.

The following relate generally to classifying adjectives and other words: *Augmenting Wordnet with Polarity Information on Adjectives*. Alekh Agarwal and Pushpak Bhattacharyaa. 3rd International Wordnet Conference, Jeju Island, Korea, South Jeju (Seogwipo) 2006; *SENTIWORDNET: A Publicly Available Lexical Resource for Opinion Mining*. In 5th Conference on Language Resources and Evaluation (2006), pp. 417-422; Vegnaduzzo, S. *Acquisition of subjective adjectives with limited resources*. In Proc. AAAI spring symposium on exploring attitude and affect in text: Theories and applications, Stanford, US (2004).

BRIEF DESCRIPTION

In accordance with one aspect of the exemplary embodiment, an authoring assistant includes a parser which identifies opinion expressions in an input text. An opinion review component generates an analysis of the text, based on the identified opinion expressions. The opinion review component computes an effective opinion of the text as a function of a measure of polarity associated with the identified opinion expressions. A representation generator generates a representation of the analysis for display on an associated user interface. The representation of the analysis includes a representation of the effective opinion. The opinion review component and representation generator can be implemented by a processor.

In another aspect, a method is provided for assisting an author. The method includes parsing an input text to identify opinion expressions in the input text and generating an analysis of the text, based on the identified opinion expressions. The generating of the analysis includes computing an effective opinion of the text as a function of a measure of polarity associated with each of the identified opinion expressions. A representation of the analysis is generated for display on a user interface. The representation of the analysis includes a representation of the effective opinion. One or more steps of the method may be performed with a computer processor.

In another aspect, a method includes extracting textual content from reviews in a corpus of reviews, each of the reviews including a rating, identifying a set of frequent nouns from the textual content of the reviews, extracting adjectival terms from the textual content of the reviews, each adjectival term being associated in the textual content with one of the frequent nouns, generating a polar vocabulary which includes at least some of the extracted adjectival terms, a measure of polarity being associated with each adjectival term in the polar vocabulary which is based on the ratings of the reviews from which the adjectival term was extracted, providing for parsing an input text to identify opinion expressions in the input text; providing for generating an analysis of the text, based on the identified opinion expressions including computing an effective opinion of the text as a function of a measure of polarity associated with each of the identified opinion expressions which is based on the measure of polarity associated with respective ones of the adjectival terms in respective ones of the opinion expressions, and generating a representation of the analysis for display on a user interface, the representation of the analysis including a representation of the effective opinion. One or more steps of the method may be performed with a computer processor.

DETAILED DESCRIPTION

The exemplary embodiment relates to an authoring assistant which can assist an author in generating or revising text to reflect a desired sentiment.

In particular, the authoring assistant can be used for checking coherency between an author's textual opinion on an item and a rating he has given for the item, such as a score or an explicit recommendation.

A "text element," as used herein, can comprise a word or group of words which together form a part of a generally longer text string, such as a sentence, in a natural language, such as English or French. In the case of ideographic languages, such as Japanese or Chinese, text elements may comprise one or more ideographic characters.

A "polar vocabulary," as used herein, includes a set of polar terms. Each polar term in the polar vocabulary may include one or more text elements. Each polar term may be associated with a measure of its polarity. The measure of polarity can be binary, such as positive/negative, or a more fined-grained measure of polarity. The authoring assistant described herein may include a polar vocabulary derived, at least in part, as described in above-mentioned copending application Ser. No. 13/052,686, filed contemporaneously herewith, entitled CORPUS-BASED SYSTEM AND METHOD FOR ACQUIRING POLAR ADJECTIVES, by Caroline Brun. However, other methods for acquiring the polar vocabulary are also contemplated.

Figure 1:
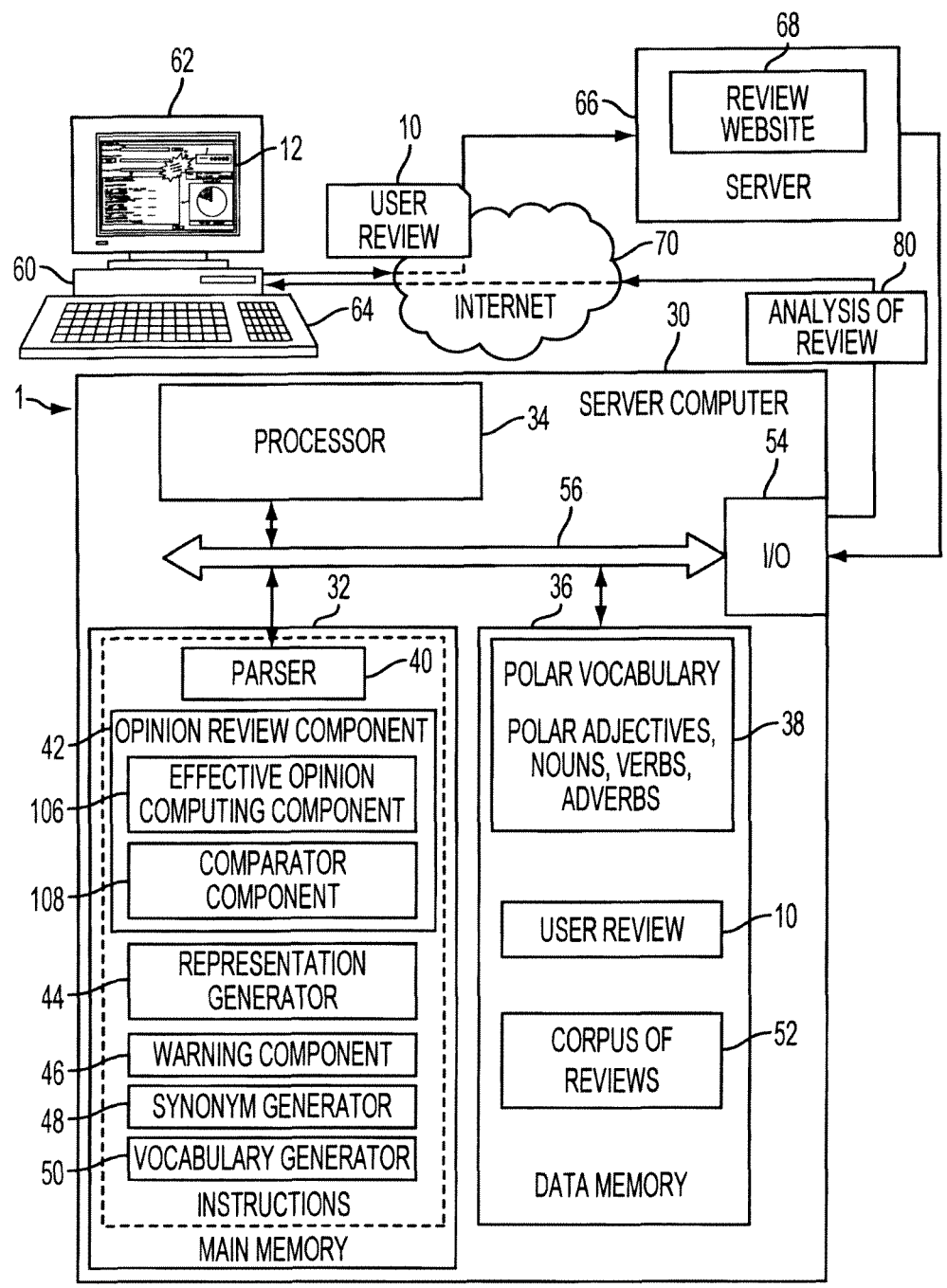
FIG. 1 is a functional block diagram of an authoring assistant.
Figure 2:
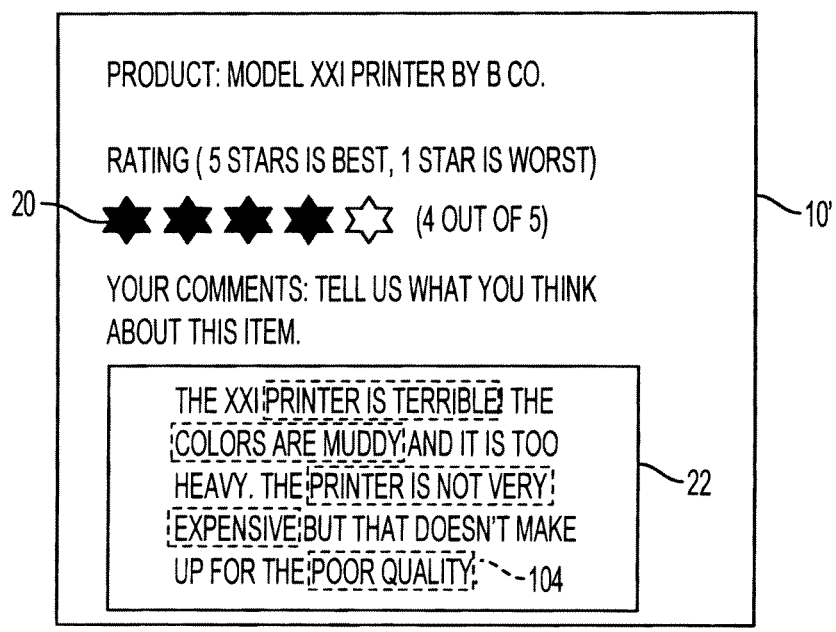
FIG. 2 is a simplified example of an incoherent review.

FIG. 1 illustrates an authoring assistant 1 (or "system") which receives a text document 10 such as a customer review, which has been prepared by an author, and generates a representation 12 of the review for presenting to the author. An exemplary review 10 is illustrated in FIG. 2. The textual comments 22 are written in a natural language, such as English or French, and may include one or more sentences about an item, such as a product, service, or the like. The person expressing his opinion optionally ranks the topic with a rating 20 on a predefined scale. The rating 20 can be a score, e.g., number of stars, a percentage, a ratio, or a selected one of a finite set of textual ratings, such as "good," "average," and "poor" or a yes/no answer to a question about the item, or the like, from which a discrete value can be obtained. For example, on some websites, people rank the products on a scale from 1 to 5 stars, 1 star synthesizing a very bad (negative) opinion, and 5 stars a very good (positive) one. On others, a global rating, such as 4/5, 9/10, is given. Ratings on a scale which may include both positive and negative values are also contemplated. The free text comment 22 is intended to correspond, in sentiment, to the overall rating 20. The authoring assistant 1 may compare the text 22 with the rating 20 to assess coherence between the two. In some cases, the free text 22 may be partially structured, for example, the user enters the positive opinions of the item being reviewed as "pros" and the negative opinions of the item being reviewed as "cons." In some embodiments, this information may be used in the comparison.

In some cases, the review 10 may provide for partial ratings, i.e., a rating of one particular aspect of the item, such as ease of use, paper handling, and the like, in the case of a printer. These partial ratings may be used, in combination with, or as an alternative to a global rating, as the overall rating 20.

While the rating 20 and text 22 may be in a review 10 of a product or other item, as in FIG. 2, in other embodiments, the rating can be one which expresses a measure of the overall polarity of the message which the author wishes to convey in the text, which can be on any topic. In either case, the authoring assistant 1 enables the user to modify the review 10 to reduce the inconsistency in sentiment between the review and the rating.

The authoring assistant 1 includes one or more computing device(s), such as the illustrated server computer 30. The computer 30 includes main memory 32, which stores instructions for performing the exemplary methods disclosed herein, which are implemented by a processor 34. Data memory 36 stores a review 10 during processing and a polar vocabulary 38.

Memory 32 stores a parser 40 for linguistically processing the text content 22 of the review 10, an opinion review component 42 for generating an analysis of the review 10, a representation generator 44, for generating a graphical representation 12 based on the analysis, a warning component 46 for warning of incoherence, and a synonym generator 48, for proposing modifications to the review, which are described in greater detail below. Memory 32 may also store a vocabulary generator 50 for generating all or part of the polar vocabulary 38, based on a corpus 52 of reviews. Components 40, 42, 44, 46, 48, and 50 and may be separate or combined and may be in the form of hardware or, as illustrated, in a combination of hardware and software.

A network interface 54 allows the computer 30 to communicate with external devices. Components 32, 34, 36, and 54 of the computing device 30 may communicate via a data/control bus 56.

The server computer 30 is communicatively connected with a graphical user interface. In the exemplary embodiment, the user interface is in the form of a remote client computing device 60, such as a PC, laptop, tablet computer, smartphone, or the like, which includes a display device 62, such as a computer monitor or LCD screen, for displaying the review 10 and representation 12, and a user input device 64, such as a keyboard, keypad, touch screen, cursor control device, or combination thereof, for inputting text to generate the review 10 and/or for revising the review. Server computer 30 may alternatively or additionally be connected with a remote server 66 which hosts a review website 68 to which the author's review 10 is being submitted. In some embodiments, some or all of the software components 40, 42, 44, 46, 48, 50 may be hosted by the client device 60 or website server 66 and/or may be distributed over two or more computing devices. The various computers 30, 60, 66 may be similarly configured in terms of hardware, e.g., with a processor and memory as for computer 30, and may communicate via wired or wireless links 70, such as a local area network or a wide area network, such as the Internet.

For example, an author accesses the website 68 with a web browser on the client device 60 and uses the user input device 64, such as a keyboard, keypad, touch screen, or the like, to generate a review 10 which may include entering, e.g., by typing, the text 22 in one or more predefined fields and selecting a rating 20 from a predefined set of ratings or on a predefined scale. During input, the review 10 is displayed to the user on the display device 62 associated with the computer 60. Once the user is satisfied with the review, the user can submit it to the review website 68. Prior to, or after, submitting the review to the website 68, the user may call on the authoring assistant 1 to check it, or the authoring assistant may be automatically actuated, for example, when the user hits a submit button. The same review website 68 can be mined by the vocabulary generator 50 for collecting many such submitted customer reviews 10 to form the review corpus 52.

The memory 32, 36 may represent any type of tangible computer readable medium such as random access memory (RAM), read only memory (ROM), magnetic disk or tape, optical disk, flash memory, or holographic memory. In one embodiment, the memory 32, 36 comprises a combination of random access memory and read only memory. In some embodiments, the processor 34 and memory 32 and/or 36 may be combined in a single chip. The network interface 54 may comprise a modulator/demodulator (MODEM).

The digital processor 34 can be variously embodied, such as by a single-core processor, a dual-core processor (or more generally by a multiple-core processor), a digital processor and cooperating math coprocessor, a digital controller, or the like. The digital processor 34, in addition to controlling the operation of the computer 30, executes instructions stored in memory 32 for performing the method outlined in FIG. 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Once the polar vocabulary 38 has been built, the vocabulary generator 50 and corpus 52 shown in FIG. 1 may be no longer needed and thus can be omitted. Alternatively, they may be retained for updating the vocabulary 38 periodically or for generating a new polar vocabulary suited to a different domain (e.g., for a different review website 68 or class of goods/services). In other embodiments, the polar vocabulary is generated by a separate computing device and/or is generated manually.

The polar vocabulary 38 includes one or more of polar nouns, verbs, adverbs, etc. The polar vocabulary 38 may thus include a large number of polar terms, such as at least ten or at least 100 or 1000 polar terms, or more, each polar term being associated, in memory 36, with its appropriate part of speech and a respective polarity measure (e.g., selected from positive/negative, polar/non polar, a strength value, or a distance based on relative frequencies of occurrence in two or more rating-based sub-corpora derived from corpus 52).

The system 1 takes, as input, the user review 10 or other text document to be evaluated and outputs an analysis 80 of the review. The analysis may include an overall effective opinion that can be extracted from the review's textual content 22 and optionally a comparison of that effective opinion with any rating 20 for the review, if present. The exemplary authoring assistant 1 can be used to analyze the review 10 before publishing it on the dedicated forum or web site 68. This provides several advantages. For example, it can be used to warn the author of the review of any potential incoherencies between the rating 20 and the opinions expressed in content 22 of the review. It can also provide the author with a global feedback about the effective opinion expressed by his comments 22, irrespective of whether he has input a rating 20. This allows the author to see whether his intention in the text (to provide a positive or negative review or to provide a polar or non-polar comment) is well reflected in the review 10. The author then has the opportunity to revise the review 10, for example by revising the text 22 and/or the user rating 20, or to allow it to remain incoherent (according to the analysis 80). In some embodiments, the author may be prevented, by the system 1, from submitting a review 10 to the website 68 until the analysis 80 shows coherence between the text 22 and the rating 20. The representation generator 44 generates the representation 12 of the analysis 80 for display on the author's screen 62.

The largely unstructured text 22 of the input review 10 is first parsed by parser 40 using a specific set of rules for extracting sentiment. These rules can include rules for extracting opinion expressions 104, such as semantic relations (denoting an association between two text elements in a sentence) which are indicative of positive or negative opinions, as illustrated in the example representation 12 shown in FIG. 4. In general, an opinion expression 104 can be any relation extracted by the parser 40 in which at least one of first and second text elements participating in the relation includes one of the terms in the polar vocabulary 38. The relation extraction rule can optionally be subject to one or more constraints, such as a constraint regarding the other text element in the relation. Some or all of the parser rules for extracting opinion expressions 104 rely on the polar vocabulary 38.

The opinion review component 42 includes an effective opinion component 106 (FIG. 1) which computes an effective opinion, based on the extracted opinion expressions 104. This may be performed by counting the number of instances of opinion expressions 104 in the text 22, together with a measure of their polarity (e.g., positive or negative, a strength value, or the like), based on the polarity measures of the polar terms in the expressions 104. For example, relative frequencies of positive and negative opinion expressions in the text 22 are computed (where the positive opinion expressions are generally those which include a positive polar term or negated negative polar term and the negative opinion expressions are generally those which include a negative polar term or negated positive polar term). Based on one or both of these frequencies, the effective opinion of the text 22 can be computed by component 106. The opinion review component 42 may include a comparator component 108 (FIG. 1) which extracts the author's rating 20 from the review 22 and compares it with the effective opinion. The warning component 46 causes a warning 118 to be provided to the user if the author's rating 20 and effective opinion, e.g., expressed as a rating or polarity, are incompatible, e.g., differ by at least a predefined threshold difference in rating or are of opposite polarity. The warning can be visual, audible, tangible (vibration), or combination thereof. The synonym generator 48 generates synonyms of adjectival terms in an identified opinion expression 104.

For example, in the review 10 illustrated in FIG. 2, the user has awarded the XXI printer an actual rating 20 of 4/5 (80% positive, 20% negative), which is highly positive. Given the large discrepancy between the effective opinion (25% positive) and the actual rating (80% positive), the warning component 46 of the system causes a warning 118 to be provided to the user, e.g., displayed as a popup message on the screen 62, as illustrated, for example, in FIG. 4.

The representation 12 may include a list 120, or other representation of the text 22, showing all the opinion expression instances 104 found by the system 1, together with an indication of their polarity. This indication can be provided through any suitable method, such as highlighting, font style or color, use of bold, underline, or the like. For illustration purposes only, the adjectival terms in the negative instances are in bold underlined and the adjectival terms of the positive instances are italicized and underlined. Additionally, a graphical representation 124 of the effective opinion may be provided in representation 12, here shown as a pie chart, although other representations, such as a histogram, or the like are also contemplated. The exemplary system displays a warning 118 only when the rating 20 and effective opinion (as illustrated in graphical representation 124) are not in agreement.

Figure 3:
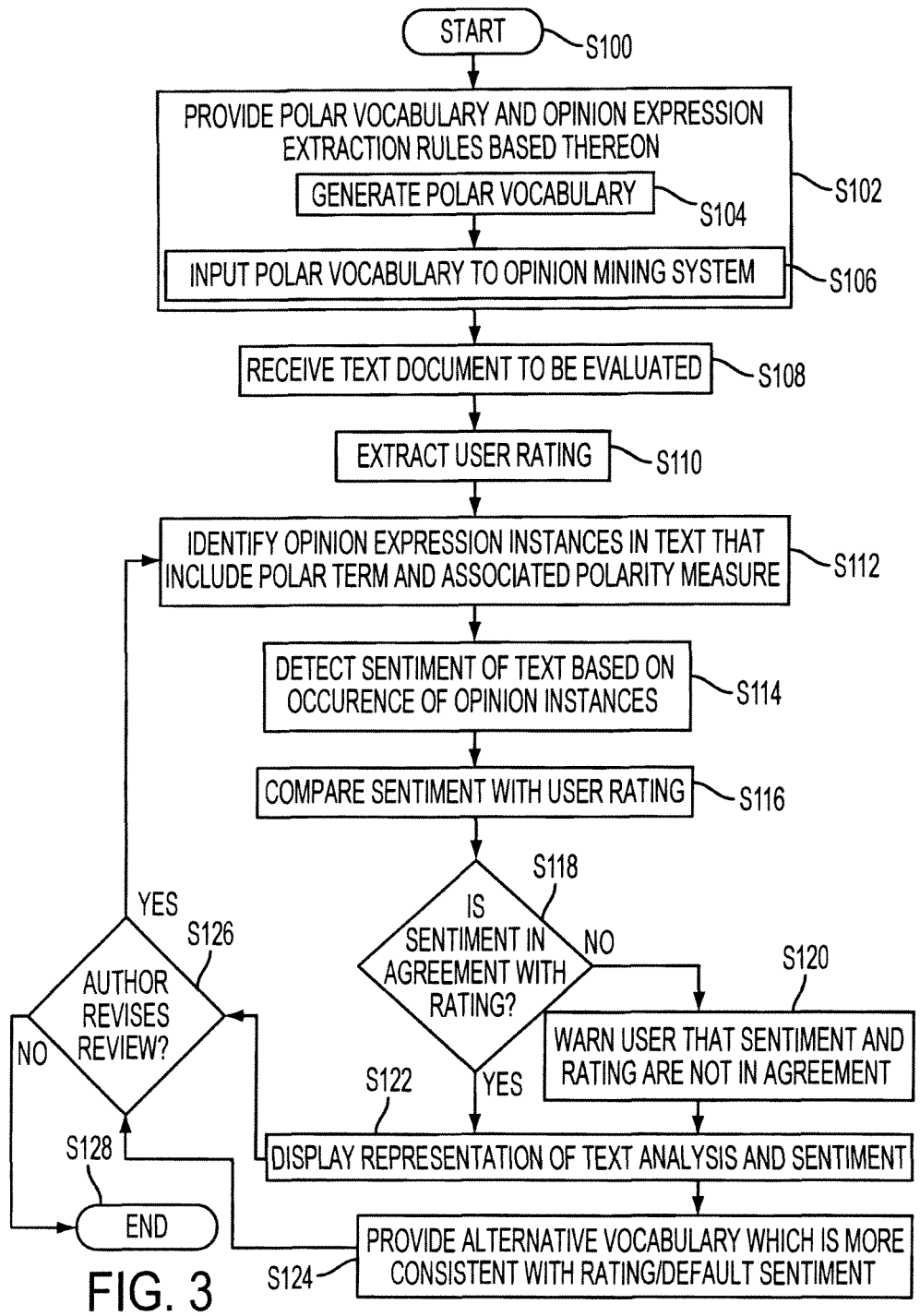
FIG. 3 is a flow diagram illustrating a method for assisting an author.

FIG. 3 illustrates the exemplary method which can be performed with the system 1. The method begins at S100. At S102, a polar vocabulary 38 is provided in memory 36 together with specific opinion extraction rules for the parser 40, based at least in part thereon. If a polar vocabulary 38 is not already generated, this step may include generating the polar vocabulary 38 (S104), e.g., according to the method illustrated in FIG. 5. At S106, the polar vocabulary 38 is stored in memory 36, together with any additional polar vocabulary to be used, and incorporated into parser rules for extracting opinion expressions based thereon. The polar vocabulary 38 may be otherwise acquired, in whole or only in part.

At S108, a text document to be evaluated, such as a review 10, is input. The review may be converted to a suitable form for processing, e.g., into XML or other markup language. The review includes text 22 which is written in a natural language, such as English or French and may include one or more sentences, which is extracted from the review, e.g., from one or more designated fields. If present, a user rating 20 may be extracted from the review at S110.

At S112, instances of opinion expressions 104 in the text 22 are identified, together with a measure of their polarity. In the exemplary embodiment, at least some of these opinion expression instances are identified based on a polar term, such as a polar adjective and corresponding polar adjective polarity measure.

At S114, the effective opinion (sentiment) of the text is determined, based on the identified opinion expressions 104.

At S116, the effective opinion may be compared with the user rating 20.

If at S118, the effective opinion and user rating are not in agreement, then at S120, a warning 118 is generated which is presented to the author through the user interface 60. Otherwise, the method proceeds directly to S122. At S122, a representation 12 of the sentiment 124 and text 120 is generated by the system and displayed to the author.

Optionally, at S124, provision is made for an author to view terms 126 (FIG. 4) which are synonyms of polar vocabulary identified in the opinion expressions 104 in text 22. This step may be performed, for example, only when the effective opinion is inconsistent with the rating 20. The author can then select one of the synonyms 126 to modify the review 10. At S126, if an author modifies the review, the method may return to S112, otherwise to S128, where the method ends.

As will be appreciated, the method may include fewer, more, or different steps and the steps illustrated need not all proceed in the order shown.

Further details of the system and method will now be described.

The Parser

The parser 40 takes a text string, such as a sentence, paragraph, or even a sequence of a few words as input and breaks each sentence into a sequence of tokens (linguistic elements) and associates information with these. The parser 40 provides this functionality by applying a set of rules, called a grammar, dedicated to a particular natural language such as French, English, or Japanese. The grammar is written in a formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Aït-Mokhtar, Jean-Pierre Chanod, and Claude Roux, "Robustness beyond shallowness: incremental dependency parsing," in special issue of the NLE Journal (2002); above-mentioned U.S. Pat. No. 7,058,567; and Caroline Brun and Caroline Hagège, "Normalization and paraphrasing using symbolic methods" ACL: Second International workshop on Paraphrasing, Paraphrase Acquisition and Applications, Sapporo, Japan, Jul. 7-12, 2003.

In one embodiment, the syntactic parser 40 may be based on the Xerox Incremental Parser (XIP), which may have been enriched with additional processing rules to facilitate the extraction of opinion expressions 104. If the parser is also used for generating vocabulary 38, it may include rules for extracting frequent nouns and adjectival terms associated with these and to filter out certain semantic classes of nouns and adjectives which are not generally relevant to polarity. Other natural language processing or parsing algorithms can alternatively be used.

The exemplary incremental parser 40 performs a pre-processing stage which handles tokenization, morphological analysis and part of speech (POS) tagging. Specifically, a preprocessing module of the parser breaks the input text into a sequence of tokens, each generally corresponding to a text element, such as a word, or to punctuation. Parts of speech are identified for the text elements, such as noun, verb, etc. Some tokens may be assigned more than one part of speech, and may later be disambiguated, based on contextual information. The tokens are tagged with the identified parts of speech.

A surface syntactic analysis stage performed by the parser includes chunking the input text to identify groups of words, such as noun phrases and adjectival terms (attributes and modifiers). Then, syntactic relations are identified, such as a relationship between a subject and a modifier which modifies it or an object and an attribute which describes it.

Where reviews are expected to be in multiple languages, such as on a travel website, a language guesser (see, for example, in Gregory Grefenstette, "Comparing Two Language Identification Schemes," Proc. 3rd Intern'l Conf. on the Statistical Analysis of Textual Data (JADT'95), Rome, Italy (1995) and U.S. application Ser. No. 13/037,450, filed Mar. 1, 2011, entitled LINGUISTICALLY ENHANCED EMAIL DETECTOR, by Caroline Brun, et al., the disclosure of which is incorporated herein by reference in its entirety) may be used to detect the main language of the review 10 and an appropriate parser 40 for that language is then employed.

As will be appreciated, while a full rule-based parser, such as the XIP parser, is exemplified, more simplified systems for analyzing the text 22 to identify opinion expressions 104 are also contemplated, which for convenience, are referred to herein as parsers 40.

For detecting the opinion expressions 104, the parser 40 includes specific rules for extracting sentiment (polarity). In particular, the parser is used to detect semantic relations from the author's comments 20 which express a sentiment and to attach a polarity measure to the sentiment. Dedicated semantic rules for detection of sentiment may be built on top of the general (English) grammar of the parser 40, which are combined with lexical information encoding the polar vocabulary 38. The polar vocabulary can be incorporated directly into the parser rules and need not be stored separately.

Some of the opinion expressions (sentiment relations) 104 extracted are those which include, as one of the elements in the relation, an adjective or other polar term which is in the polar vocabulary 38. For example some parser rules relevant to adjectival terms (terms including an adjective, e.g., serving as a modifier or attribute) in the polar vocabulary 38 could be of the form:

Extract MODIFIER(noun X, modifier Y) and POLARITY (Y)
Generate SENTIMENT[POLARITY](X,Y)
or
If Extract (noun X, modifier Y) and POLARITY(Y)
Then Generate SENTIMENT[POLARITY](X,Y)
or
Extract ATTRIBUTE(noun X, attribute Y) and POLARITY(Y)
Generate SENTIMENT[POLARITY](X,Y)

where X can be any noun or may be limited to certain classes of noun, and/or to a list of nouns, as for the frequent nouns, Y can be any adjectival term among the polar adjectives in vocabulary 38, and POLARITY is the polarity measure with which Y is tagged (e.g., positive or negative). As will be appreciated, further constraints may be placed on these rules. For instances of negation, similar rules may be provided:

If Extract MODIFIER_NEG(noun X, modifier Y) and POLARITY(Y), or
Then Generate SENTIMENT[REVPOLARITY](X,Y),
or
If Extract ATTRIBUTE_NEG(noun X, attribute Y) and POLARITY(Y)
Then Generate SENTIMENT[REVPOLARITY](X,Y),
where REVPOLARITY is the reverse polarity with which Y is tagged (e.g., from positive to negative) when negation is identified.

Some of the opinion mining rules may relate to nouns, pronouns, verbs, and adverbs which are in the polar vocabulary 38. These words and the rules which employ them may have been developed manually and/or through automated methods. For example rules relating to verbs might be of the form:

If Extract SUBJECT(verb X, noun Y) and POLARITY(X)
Then Generate SENTIMENT[POLARITY](X,Y)
or,
If Extract OBJECT(verb X, noun Y) and POLARITY(X)
Then Generate SENTIMENT[POLARITY](X,Y)
where Y can be any noun and X can be a verb of polarity measure POLARITY.

In case of negation of the verb, similar rules can be provided:
If Extract SUBJECT_NEG(verb X, noun Y) and POLARITY(X)
Then Generate SENTIMENT[REVPOLARITY](X,Y)
or,
If Extract OBJECT_NEG(verb X, noun Y) and POLARITY(X)
Then Generate SENTIMENT[REVPOLARITY](X,Y)
where REVPOLARITY is the reverse polarity with which X is tagged (e.g., from positive to negative) when negation is identified.

In some embodiments, the parser 40 may include a coreference module which identifies the noun which corresponds to a pronoun in a relation, by examining the surrounding text. For example, given a review which states:

I just bought the XXI printer. It is excellent.
the pronoun "It" can be tagged by the coreference module of the parser to identify that it refers to the noun "printer," allowing extraction of the syntactic relation: MODIFIER(printer, excellent) and an opinion expression: SENTIMENT[POLARITY](printer,excellent).

Other methods for extracting sentiment which may be used in the method, are described, for example, in the references mentioned above, the disclosures of which are incorporated herein by reference.

When a rule identifies a semantic relation 104 in the text 22 which includes a term in the polar vocabulary 38, it is flagged with the appropriate polarity, taking into account negation, as discussed above, which reverses the polarity. Each time such an opinion expression 104 is identified, the system 1 generates an item in the list 120, and increments the appropriate count of positive or negative opinion instances.

Detection of Effective Opinion (Sentiment of Author Comments) (S114)

The effective opinion is determined (by the effective opinion component 106) from all of the occurrences of opinion expressions 104 identified in the text 22 by the parser at S112. This can be determined by counting all the positive (or negative) opinion expressions 104 in the text 22 and dividing by the total number of positive and negative opinion instances, which can then be expressed as a percentage. In this embodiment, the relative positivity or negativity (i.e., the strength of the expressed sentiment) of the polar terms is not taken into account.

In other embodiments, the positive and negative opinions expressions are weighted, based on a relative positivity or negativity of the participating polar term(s) from the polar vocabulary. The polarity measure, in this case, can be determined from a label/strength value assigned to the polar term. For example, an opinion expression instance 104 with a polar adjective tagged as quite positive in it may be counted as +1, whereas an instance with a very positive polar adjective may be counted as +2, i.e., with twice as much weight as a quite positive one. In the case of negation, an instance with a quite positive polar adjective may be scored as quite negative, and vice versa.

In the case of negation of very positive or very negative polar adjectives, however, negation may not imply the exact opposite. For example, an author who states: This printer is not very expensive, is often giving only a quite positive opinion, and not a very positive opinion (in which case, they are more likely to say the printer is very inexpensive). This may be factored into the scoring, with negation being given less weight when converted to the polar opposite. Suitable strength values for the polar vocabulary 38 can be determined through evaluation of the system 1 on a test corpus 52 of reviews and optimizing the strength values so that the effective opinions correlate well with the actual ratings.

The effective rating, in the weighted case, can be determined by adding all the positive (or negative) scores (e.g., +1 for quite positive, +2 for very positive) and expressing this as a ratio or percentage (% pos or % neg) of the total positive and negative scores.

As will be appreciated, some opinion expressions may include more than one polar term. For example, not only adjectives but also nouns and other polar vocabulary may be considered and optionally scored and/or strength value weighted in the opinion expressions 104. Where an opinion expression 104 is a semantic relation which includes a polar adjective and another polar word in vocabulary 38, for example, the score for the opinion instance 104 may reflect the score for each term. For example, given the sentence: This printer is a terrible nuisance, the system may extract the relation: ATTRIBUTE(terrible, nuisance), POLARITY terrible=−2, POLARITY nuisance=−1, and score this instance 104 as a sum (or other function) of the scores of the polar words terrible and nuisance (e.g., −3).

In some embodiments, the effective opinion, which is based on the scores of each of the instances 104 identified, is expressed in the same format as the rating 20, e.g., a binary decision selected from positive and negative, a ratio, such as 3/5 stars, a percentage, a score, or the like, to allow a direct comparison with the rating.

In some embodiments, the effective opinion may be a binary decision. For example, effective opinion may be considered positive, if a threshold percentage of the opinion expressions 104 are tagged as being positive (in the case where each instance gets a score of 1) or if the total positive score exceeds a threshold percentage (where opinion expressions are weighted). If the rating 20 is binary (e.g., if the user is simply asked if he recommends/does not recommend the product), the threshold percentage for the effective opinion to be considered positive may be set at 50% or otherwise established, e.g., by evaluating a set of opinions and determining at what percentage, on average, the user will give a positive rating. To do this, a test corpus 52 may be filtered in two sub corpora: one containing the recommended products, and the other containing the not recommended products. If the effective opinion threshold (% pos) is set at 50%, then it is assumed that if the system extracts equal or greater than 50% of positive opinion instances from a review (≥50% pos), it should be recommended by the user, and if the system extracts more than 50% negative opinion relations (>50% neg), it should be not recommended by the user. The system works reasonably well, in practice, on this threshold, and is a better predictor than existing opinion mining systems.

Figure 4:
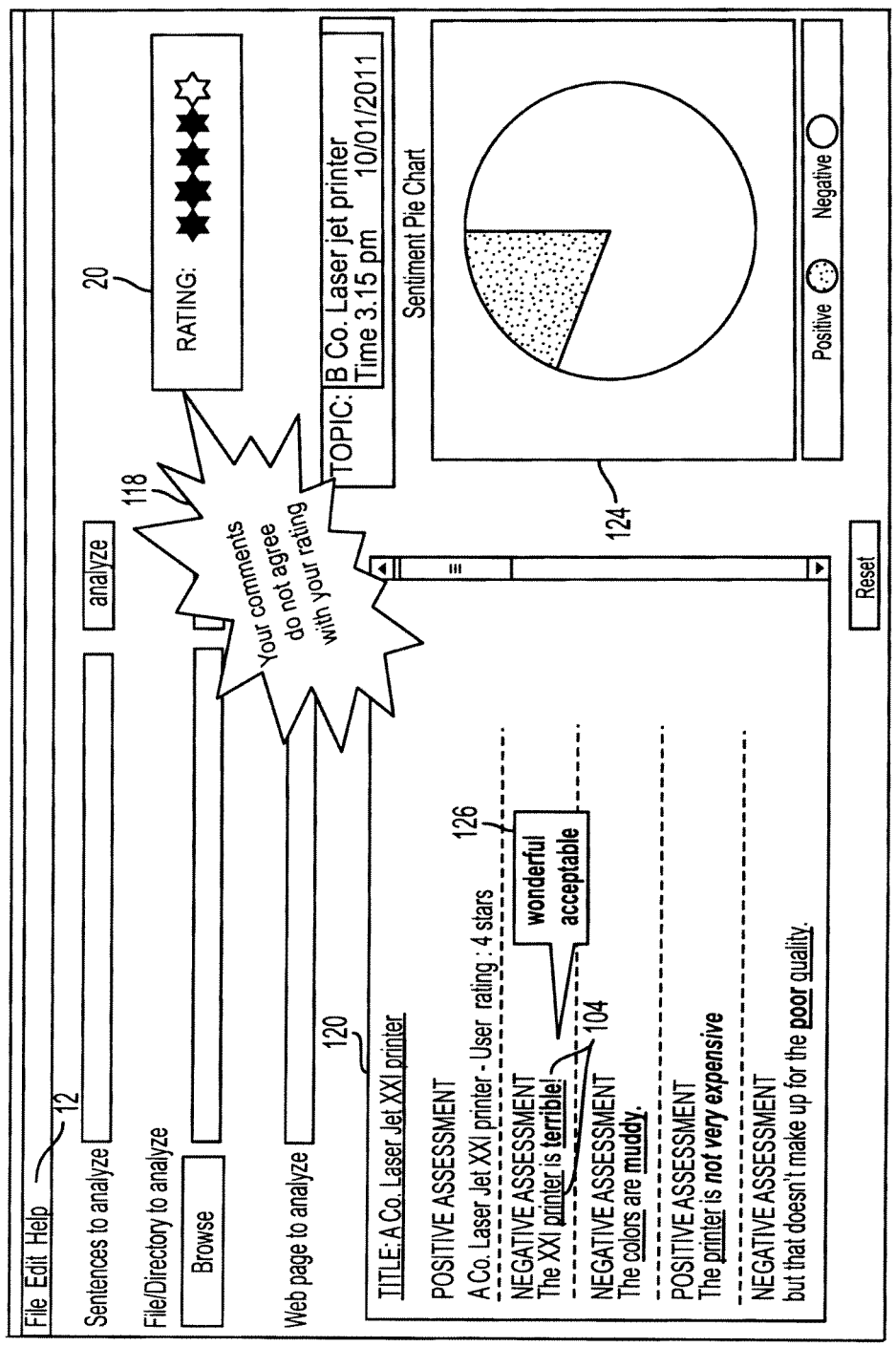
FIG. 4 is a simplified example review analysis interface showing an exemplary representation of an analysis of a review.

For example, given a review 10 as shown in FIG. 4, the system 1 identifies several opinion expression instances 104 which include polar adjectives, as illustrated in TABLE 1 (for simplicity all polar terms are scored as +1 or −1):

TABLE 1

| Opinion instances | negative polarity | positive polarity |
|---|---|---|
| MODIFIER(printer, terrible) | 1 | |
| MODIFIER(colors, muddy) | 1 | |
| MODIFIER_NEG(printer, expensive) | | 1 |
| ATTRIBUTE(quality, poor) | 1 | |
| Total instances | ¾ | ¼ |
| Effective opinion | 25% positive, 75% negative- overall opinion-negative | |

Since the system detects less than 50% positive opinions, the effective opinion is considered negative. If the system uses weights on polarity, a different threshold may be appropriate.

Inconsistency detection (S116)

The system comparator 108 compares the effective opinion computed at S114 with the author's rating 20. For example, in the case of a review 10 as shown in FIGS. 2 and 4, the system 1 detects that the negative effective opinion is inconsistent with the positive opinion given by the author's rating 20. While in one embodiment, the comparator 108 compares two binary (positive or negative) decisions to see if they are the same, in other embodiments, a more fine grained comparison may be made, such as whether the effective rating is consistent with a 4/5 star rating or not. For example, thresholds on the positive score (% pos) may be established for each possible rating, allowing for some variability to account for the difficulty of correctly matching the % pos with the ranking based on a relatively small sample. For example, a % pos of ≤25% could be used to determine that the effective opinion is inconsistent with a rating of 3/5 stars and higher, if there are sufficient opinion instances on which to base the decision.

When performed at authoring time, this automatic analysis enables a warning 118 to be provided to the user about the discrepancy. Incoherence detection of this type can be useful for the author of the review, when writing the review. The author may be provided with the opportunity to modify the review before posting it. It may also find application for the moderators of a review website. For example, reviews which are determined to be inconsistent may be filtered out or other action taken, such as a notice sent to the reviewer or blocking the reviewer from submitting further reviews.

Generation of Representation (S122)

The representation generator 44 synthesizes the representation 12 of the review. As will be appreciated, the synthesis and/or display of the representation 12 may be performed in whole or in part by software operating on the client device 60. The exemplary representation 12 includes a graphical representation 124 of the effective opinion, for example as a pie chart, as shown, for example, on the interface illustrated in FIG. 4. In one embodiment, this representation may be provided to the author at authoring time. This is feasible as reviews 10 are often relatively short (e.g., predominantly 1000 words or less) and the parser 40 can analyze these reviews very quickly. The author of the review can then see at a glance if the review 10 corresponds to the message that he wants to convey. If he decides to adjust this message, he can see the positive and negative opinions highlighted in the review at 120, and change them in order to moderate, or, alternatively, to reinforce them. For example, adjectives like atrocious, abominable, are very negative, far stronger than weird or inefficient. In the same way, positive verbs like adore or revere are stronger than like or appreciate. A user finding his review too neutral, according to the global feedback 124 presented, may be automatically presented with synonyms 126 of one or more of the polar vocabulary terms he has used (S124). In one embodiment, the suggested synonym(s) 126 may be only those having a higher strength, as indicated by their tags. Alternatively, a user finding the message overly polar could be automatically suggested, by the synonym generator 116, to replace some polar vocabulary with synonyms with a lower strength in order to tone down the message conveyed. The synonyms 126 presented may be drawn from the same polar vocabulary 38, e.g., based on their strength value, and a link which indicates they are a synonym to the word being replaced. Or, in the case of adjectives, if the author is looking for a more neutral term, the synonyms may include a relevant term selected from a set of objective terms (identified in the method of FIG. 5). Alternatively or additionally, the synonyms may be extracted, prior to or at run time, from a lexical resource, such as a thesaurus (without reference to polarity) or SentiWordnet. A "lexical resource" can be any stored data structure which indexes text elements according to their meaning, and, in the exemplary embodiment, enables semantic types (or "contexts") of attributes and modifiers to be identified and associated with a sentiment for that context. The sentiment may be automatically generated, i.e., without user input, by natural language processing of a large corpus of text.

This functionality of providing the author with alternative terms may also be of benefit for people authoring sensitive content (in a political or professional context for example), to help to control the impact of their message. For example, the author could be asked to provide a rating 20 which expresses the message he would like to convey in his text, e.g. neutral, slightly polar or very polar (or a default rating is applied). The system 1 analyzes the text 10 to determine if the opinion instances are individually and/or collectively in agreement with the selected and, if not, propose alternative terms. In some fields, the rating may be set, for example at neutral, by default.

As noted above, in some embodiments, rather than simply identifying the opinion expression instances 104 as positive or negative, i.e., a binary decision, a strength value may be associated with each or some of the instances 104 or with individual terms in them. This may be based on the strength value which is associated with the polar term(s) used in the instance 104. The strength value of each instance/term may then be reflected in the representation, e.g., in list 120. Highly polar positive words, for example, could be highlighted in red while quite polar positive words could be highlighted differently, e.g., in pink.

The exemplary authoring and validating assistant, when provided at review authoring time, has advantages over existing opinion mining systems. First, it can be used to warn the user about possible incoherence in their review, and to provide the author with the global tendency of their review, which allows the user to adjust the review, if needed, prior to submission and/or publication. It can also provide a tool which enables the author to select appropriate opinion vocabulary which is consistent with the message the user wishes to convey.

Generation of Polar Vocabulary (S104)

The polar vocabulary 38 can include polar terms generated by the vocabulary generator 50 using the method described in copending application Ser. No. 13/052,686 and as described in further detail below, using a corpus 52 of reviews from a particular domain. Briefly, in order to detect the most discussed elements in the corpus 52, all nouns presents in the corpus are extracted, with the parser 40. Some of these may be filtered out, such as proper nouns, nouns relating to temporal expressions ("today," "yesterday," "December," etc.), unknown words, and urls or email addresses. This filtering may be achieved by putting constraints on the lexical semantic features provided by the parser and by using a named entity module to identify named entities. The named entity module may access a lexical resource to identify some of the named entities. Systems and methods for identifying named entities and proper nouns are disclosed, for example, in U.S. Pub. No. 20080071519, by Caroline Brun; U.S. Pub. Nos. 20080071519, 20080319978, 20090204596, and 20100082331, by Caroline Brun, et al.; and U.S. Pub. No. 20100004925, by Julien Ah-Pine, et al., the disclosures of which are incorporated herein by reference in their entireties. The remaining nouns are then associated with their frequencies in the corpus. The frequency can be expressed as the number of occurrences divided by the total number of occurrences of the nouns extracted, expressed as a percentage.

A threshold on the frequency may be established to filter out less frequent nouns. For example, the list of nouns is filtered to include only those nouns with a frequency which is above a defined threshold, e.g., 0.1%, or to select, for example, the N nouns with the highest frequencies, where N may be, for example, at least 10, such as at least 50 nouns, or a combination of filtering methods may be employed.

In some embodiments, a human reviewer may review and validate the list of nouns, although this should not generally be needed in most domains.

Figure 5:
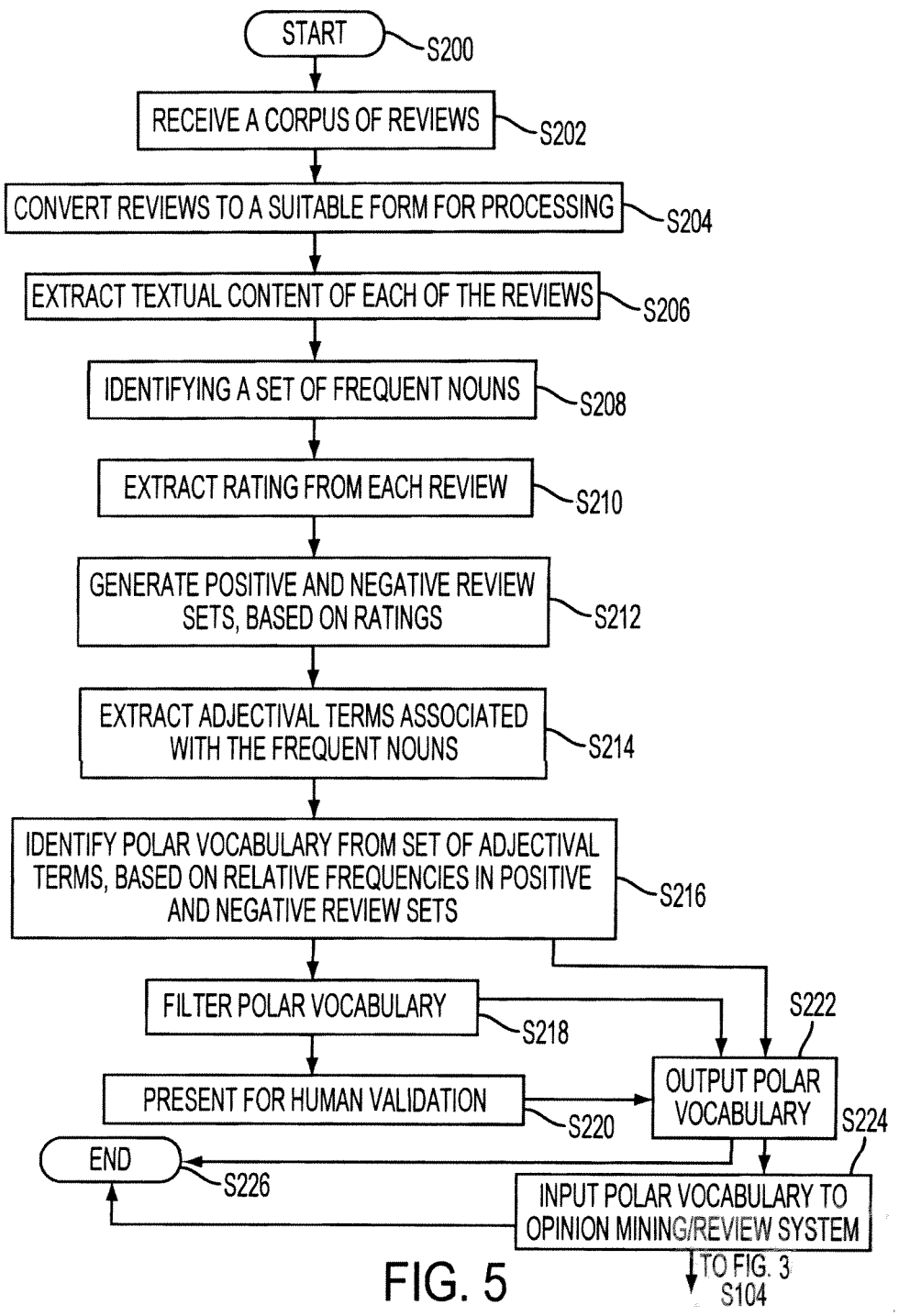
FIG. 5 is a flow diagram which illustrates a method for generating polar adjectival terms.
Figure 6:
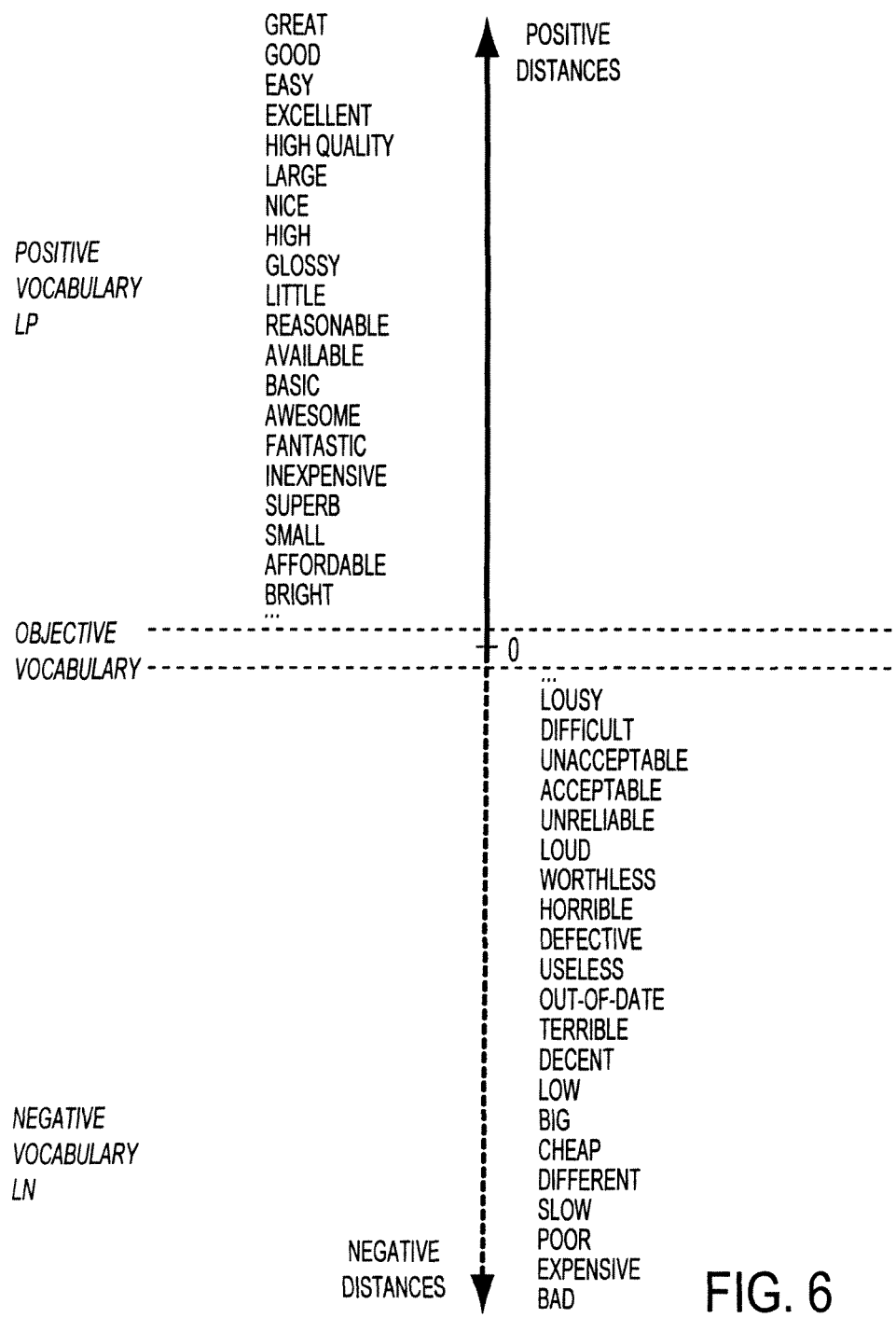
FIG. 6 illustrates a candidate polar vocabulary.

FIG. 5 illustrates a method for generating the polar vocabulary 38, which can be used in step S104 of the method shown in FIG. 3. The method begins at S200.

At S202, a corpus 52 of reviews, e.g., in a specific domain (e.g., taken from website 68), is collected and stored in memory.

At S204, the reviews may be converted to a suitable form for processing, e.g., into XML or other markup language.

At S206, textual content 22 of each of the reviews is extracted.

At S208, a set of the most frequent nouns in the corpus 14 ("frequent noun set") is identified by parsing the textual content 22 of the entire corpus 52.

At S210, from each of the reviews, a user rating 20 is extracted and stored in memory.

At S212, a plurality of sub-corpora is generated from the corpus 52, based on the user ratings. For example, positive and negative sets (sub-corpora) of reviews are generated. This may include assigning at least some of the reviews 10 in the corpus 52 to a positive corpus of reviews CP and others to a negative corpus of reviews CN, based on their user ratings 20.

At S214, in the text 22 of the positive and negative review sets CP, CN, adjectival terms comprising an adjective, such as adjectival phrases and single words, are identified which are in an identified relation with one the nouns in the frequent noun set.

At S216, based on a measure of occurrence of the adjectival terms in the positive and negative sets of reviews CP, CN, a candidate polar vocabulary is identified, where each term in the candidate polar vocabulary is associated with a polarity measure (e.g., positive or negative, or a more fine-grained measure of polarity). In the exemplary embodiment, positive and negative sets of terms are generated.

At S218, the candidate polar vocabulary may be filtered to remove adjectival terms which are objective rather than polar and to remove/reclassify terms which have lexical information which suggests they may be wrongly classified in the positive or negative set.

At S220, the remaining candidate polar vocabulary may be presented to a human reviewer for review and validation.

At S222, the polar vocabulary may be output and stored in memory, either in the system or elsewhere.

At S224, the thus generated polar vocabulary may be input to system 1 for use in evaluating new reviews or any other text.

The method ends at S226.

Various aspects of the vocabulary generation method will now be described.

The Corpus of Reviews

In the exemplary embodiment, reviews relating to only a single class of goods or services are selected to form the corpus 52 of reviews. In this way, the polar vocabulary 38 is domain specific. For example, for generating a polar vocabulary specific to printers, only those reviews expected to relate to printers may be included in the corpus. For example, reviews may be filtered using keywords and/or by using the structure of the opinion website, for example, to identify reviews relating to goods offered for sale by a predetermined set of known printer manufacturers. While printers are described as an example, other classes of goods and services are also contemplated.

In general, the corpus 52 includes a large number of reviews analogous to review 10, such as at least 100 or 1000 or more reviews. The reviews are submitted by multiple different authors, each operating on a respective client device 60, although it is contemplated that some of the reviews may have been submitted by the same author and/or from the same client device.

Generation of Sets of Reviews (S212)

Two (or more) sets of reviews are identified, such as a set of positive reviews (positive review corpus) CP and a set of negative reviews (negative review corpus) CN. The classification of each review 10 into a respective corpus may be based on the ratings 20. If the rating is a score or ratio, for example, the reviews in the positive set all have a more positive rating than the reviews in the negative set. Reviews with ratings which are inconclusive, i.e., neither very positive nor very negative, may be filtered out. For example, if the reviews are ranked from 1 to 5, only those ranked 5 may be included in the positive set and only those ranked 1 may be included in the negative set.

In other embodiments, the reviews may be classified based on a binary rating 20, such as an overall "positive" or "negative" rating given by the user in the review, where the review provides for this. In this case, a non-binary rating, such as a score or ratio, may be used to filter out inconclusive reviews.

In some cases, the review 10 may provide for partial ratings, i.e., a rating of one particular aspect of the item, such as ease of use, paper handling, and the like, in the case of a printer. These partial ratings may be used, in combination with, or as an alternative to, the rating 20 to provide the user rating used in identifying the two sets CP, CN.

Extraction of Adjectival Terms Associated with the Frequent Nouns (S214)

The parser 40 is used to extract, from the positive and negative sets of reviews, modifiers and attributes that are in a (syntactic) relation which also includes one of the set of frequent nouns. For example, given the review:

User Rating: 1 star.

Review Summary: Do NOT buy this! Pros: None. Cons: Poor design, cheap construction, expensive cartridges.

and assuming that design, construction, and cartridges are all among the set of frequent nouns, the system extracts:

MODIFIER(poor, design)
MODIFIER(cheap, construction)
MODIFIER(expensive, cartridge)

In another example, given the review:

PrinterCo's ink system is great.

The system extracts:

ATTRIBUTE(system, great).

The parser 40 also detects negation. This information is taken into account since negation on polar adjectives has the property of inverting polarity. For example, given the review:

Color printing is decent but not great.

the system extracts:

ATTRIBUTE(decent, printing)
ATTRIBUTE_NEG(great,printing).

The semantic properties of adjectives can be used in order to filter out adjectives which are not polar adjectives, but which can be considered as objective terms. For example, some of the adjectives are tagged by the parser 40 with a semantic class. Examples of classes of adjectives which may be filtered out in this way may include adjectives of color (e.g., grey printer), adjectives relating to time or age (e.g., old printer), adjectives relating to measures (large printer), and adjectives denoting a country (Japanese printer). The types of objective adjectives which are filtered out may, in some cases, be domain specific.

The coreference module of the parser 40 may be used in the extraction of relations, as described above.

Identifying Polar Vocabulary from Adjectival Terms (S216)

The adjectives present in the relations extracted at S214 are used to generate the two lists of polar adjectives based on a measure of each term's occurrence in the positive and negative review sets. This can be performed as follows:

A first list LP of candidate positive polar adjectives contains: a) all adjectives extracted from the positive corpus of reviews CP which are not negated and b) all adjectives extracted from the negative corpus of reviews CN which are negated; frequencies of the adjectives, as computed above, are provided.

A second list LN of candidate negative polar adjectives contains: c) all adjectives from the negative corpus of reviews CN which are not negated, and all adjectives from the positive corpus CP which are negated; frequencies of the adjectives, as computed above, are provided.

All adjectives that are present in LP and absent in LN can be added to LN with a frequency of 0. All adjectives that are present in LN and absent in LP can be added to LP with a frequency of 0.

The two lists LP, LN thus can contain exactly the same adjectives, but in LP, frequencies are calculated relative to the positive sub corpus CP (and negation of the negative sub corpus CN), and in LN, frequencies are calculated relative to the "negative" sub corpus CN (and negation of the positive sub-corpus CP). Then, a distance (a scalar value) is associated with each adjective A of the list in the following manner:

$Dist(A)=FP(A)-FN(A)$, where FP is the frequency of the adjectival term in LP, i.e.

$$FP(A) = \frac{\text{number of occurrences of the adjectival term } A \text{ in } CP \text{ and of its negated adjectival term } NA \text{ in } CN}{\text{total number of occurrences of adjectival terms in } LP},$$

and
FN is the frequency of the adjectival term in LN:
i.e.

$$FN(A) = \frac{\text{number of occurrences of the adjectival term } A \text{ in } CN \text{ and of its negated adjectival term } NA \text{ in } CP}{\text{total number of occurrences of adjectival terms in } CN}.$$

Thus, for example, if the adjective "terrible" occurs 200 times in the negative corpus, occurs 100 times in the positive corpus as "not terrible" or equivalent negation, and occurs 20 times in the positive corpus without negation, and the positive and negative corpuses have a total of 20,000 and 30,000 adjectival term occurrences, respectively, then the polarity measure of the term "terrible" can be computed as:

$$\frac{20}{20000} - \frac{200+100}{30000} = -0.009$$

As will be appreciated, other methods of computing the distance Dist(A) (a measure of polarity) of each adjectival term are contemplated, which are a function of the occurrences of each adjectival term in each corpus, taking into account negation. The distance Dist(A) reflects the difference of weight of an adjective between the positive corpus CP and in the negative corpus CN. A positive distance indicates that the adjective is associated, more frequently, with the positive corpus CP than with the negative corpus CN. A negative distance shows, the reverse, i.e., hat the adjective is associated, more frequently, with the negative corpus CN than with the positive corpus CP (a more important weight in the negative corpus).

The list of adjectives can then be reordered according to distance, from the most positive distance to the most negative distance.

This ordered list contains both highly positive and highly negative vocabulary as well as objective vocabulary (i.e., more neutral), which has a distance closer to zero. The neutral vocabulary may be used in the generation of synonyms in S124 of FIG. 3 above.

Filtering the Candidate Polar Vocabulary (S218, S220)

Filtering of the list 10 may be performed automatically (S218) and/or manually (S220).

The objective vocabulary may be automatically filtered from the list (S218). In one embodiment, a threshold distance may be set on both the positive and negative side to filter out at least some objective vocabulary. For example, all terms with a Dist(A) of between +0.001 and −0.001 could be filtered out in the above example. In another embodiment, only the top N most positive and most negative terms, according to Dist(A) may be retained.

In another embodiment, a lexical resource is used to filter out at least some of the objective vocabulary. The lexical resource can alternatively or additionally be used to correct any clearly erroneous assignments of adjectival terms to the lists (e.g., a clearly positive term with a negative distance, or vice versa). The lexical resource may provide information on the sentiment (e.g., selected from positive, negative, and objective) of words when used in one or more contexts. Some words have different sentiments depending on the context (such as flat stomach and flat scene) and for purposes of the exemplary embodiment, a global estimate of the sentiment may be computed, based on the scores for each of the contexts.

The lexical resource can be a local resource stored in memory 36 and/or can be an online resource which is accessed by the system over the network 70. One exemplary lexical resource which can be used is SentiWordnet (see, Esuli Andrea, Sebastiani Fabrizio, "SENTIWORDNET: A Publicly Available Lexical Resource for Opinion Mining" in 5th Conference on Language Resources and Evaluation, pp. 417-422 (2006)). SentiWordNet is a lexical resource dedicated to opinion mining. SentiWordNet assigns, to each synset of WordNet, three sentiment scores: positivity, negativity, objectivity. While SentiwordNet is a valuable resource in opinion mining, it is not suited to generating a polar vocabulary on its own since it lists every possible context in which a word can be used, and does not provide any indication as to how representative each context is of the global usage of that word. Moreover, since the contextual usage may differ by domain, this is not considered either.

In one embodiment, for each term A in the lists LP and LN, an average of the SentiWordNet positivity scores for all contexts of the word A is computed and an average of the negativity scores for all contexts of the word A is computed. The positivity and negativity scores are used to assess whether a word A is properly classed in the list LP or LN only when the average score is a clear indicator of positivity or negativity. For example, if the average positivity at least meets a predetermined threshold and the term A is in the negative list LN, the term A is considered to be incorrectly assigned to list LN, and may be moved to the positive list LP, and vice versa. Additionally, the objectivity scores for each of the contexts of the term A may be averaged to generate an objectivity score. A term A with an objectivity score which at least meets an objectivity threshold score may be removed from the list(s) LP, LN.

In some embodiments, rather than simply designating the terms in the list as positive or negative, they may each be assigned a strength value which is indicative of the relative positivity or negativity. The strength value can be based on the distance Dist(A) computed at S216. For example, the distance range is quantized to provide a set of two or more positive strength values and two or more negative strength values. These values may be associated with a textual description suitable for presenting to a user, such as a respective one of: very positive, quite positive, quite negative, and very negative. Each term on the list is then assigned a respective one of these classes, based on its computed distance. For example, if distances of −0.001 to −0.003 are labeled with a polarity measure of quite negative and values of −0.003 and more negative are labeled as very negative, the term "terrible," with a distance of −0.009 in the above example, would be labeled with a polarity measure of very negative. These distance measures/strength values can be used by the authoring assistant 1, as described above. In other embodiments, the terms in the polar vocabulary are manually assigned to one of these polarity groups and/or accorded a numerical strength value.

In some embodiments, the list of polar vocabulary 38 and associated polarity measure may be presented to a human reviewer (S220). In this embodiment, the human reviewer reviews the list and may either validate it without changes or modify it, e.g., to add/remove one or more terms and/or to adjust their polarity.

Storing the List

The optionally filtered list of polar vocabulary 38 thus generated may be stored in memory 36 of the computer 30. Each adjectival term may be tagged with a measure of polarity, such as positive or negative polarity, its strength value, and/or Dist(A). The polar vocabulary 36 may thus include a large number of adjectival terms, such as at least ten or at least 100 adjectival terms, each associated with a respective polarity measure.

The method(s) illustrated in FIGS. 3 and/or 5 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary method(s) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3 and/or 5, can be used to implement the method(s).

Without intending to limit the scope of the exemplary embodiment, the following examples describe a prototype system for identifying a polar vocabulary and its application on a polar corpus, and the use of the polar vocabulary in an authoring assistant.

EXAMPLES

Example 1

Building a List of Polar Adjectives

A relevant corpus 52 from the Epinions™ website (www.e-pinions.com) was obtained. The reviews posted on the website consist of consumer-generated reviews, buying tips and advice, ratings, price information, and are searchable in a variety of ways from price to product type. From this website, 3700 customer reviews 10 were collected about products for a set of printer brands, which are referred to herein by the generic names A, B, C, and D. The reviews were converted an XML format compatible with the linguistic tools used (based on Xerox's XIP parser). A study of this corpus shows that opinions are expressed on the product itself (i.e., printers, scanners, fax, machines), but also on the characteristics or physical elements of this product. These characteristics can be the quality, the weight, the size, the price, and the like and the related elements can be the cartridges, the ink, and the like. It can also be observed that the effective opinions are mainly expressed by adjectival modifiers or attributes (e.g., the printer is heavy, the cartridges are expensive, a useless feature . . . ).

All nouns presents in the corpus are extracted with the parser. Proper nouns, nouns relative to temporal expressions, unknown words, and urls or email addresses are filtered out. The remaining nouns are then associated with their frequencies in the corpus. In this example, 6372 different nouns (with a total of 473,649 occurrences) are extracted by this method, with frequencies ranging from 7.47% to 0.000211%. TABLE 2 lists the 20 most frequent nouns extracted from the reviews, with their frequencies as determined by their number of occurrences divided by the total occurrences of nouns extracted (473,649), expressed as a percentage:

TABLE 2

| NOUN | FREQUENCY | NOUN | FREQUENCY |
| --- | --- | --- | --- |
| printer | 7.47% | computer | 0.95% |
| print | 2.6% | problem | 0.89% |
| paper | 2.58% | software | 0.87% |
| color | 2.06% | fax | 0.81% |
| page | 2.05% | document | 0.76% |
| cartridge | 1.95% | price | 0.75% |
| ink | 1.90% | tray | 0.73% |
| quality | 1.76% | copy | 0.72% |
| photo | 1.72% | text | 0.71% |
| machine | 1.24% | size | 0.65% |
| ... | ... | ... | ... |

TABLE 2 clearly illustrates that the most frequent nouns express the most discussed concepts that related to the main review topic. Consequently, it can be expected that polar adjectives will be found co-occurring with these nouns, either as modifiers ("a tremendous printer"), or attributes ("The quality is terrible"). This list of nouns can be used to extract polarity adjectives.

A threshold on the frequency of 0.1% is established to filter out less frequent nouns. In the example, 160 nouns of the 6372 extracted were selected. By manually examining the list, it can be seen that nouns of lower frequency in the list very rarely refer to a central concept or topic of the review.

To identify positive and negative review sets, all "1 star" reviews (428 reviews) and all "5 star" reviews (1422 reviews) are selected from the corpus 52 (S212), to constitute the positive corpus CP and negative corpus CN, respectively.

All modifiers and attributes in CP and CN that are in syntactic relations which including one of the selected nouns are extracted. Instances of negation are identified, and adjectives in certain objective classes are filtered out (adjectives relating to color, time or age, measures, and country).

The two lists LP and LN of adjectives are then constituted, as described above, and a distance Dist(A) is associated with each adjective A of the list (computed as described above). A list of 628 different adjectives with distances ranging from +0.056 to −0.054 is obtained. Upon reordering according to the distance, from the most positive to the most negative, a list as illustrated in FIG. 8 was obtained, which shows only the 20 adjectives with the most positive distance (top of the list) and the 20 adjectives with the most negative distance (bottom of the list), for illustration purposes.

This ordered list contains positive and negative vocabulary, and it can be seen that the vocabulary which has the most positive distance and the most negative distance is the most reliable indicator of opinion. The list contain also objective vocabulary (i.e., neutral, not shown), since such adjectives can also be associated with the main concepts (frequent nouns) selected.

The SentiWordNet lexical resource was then used to correct clear errors and filter out some of the most objective vocabulary. As SentiWordNet keeps all WordNet ambiguity, the average positivity, negativity, and objectivity are computed for all adjectives on the list LP, LN, by summing positivity, negativity, and objectivity scores assigned by SentiWordnet to each sense of an adjective and dividing by the number of senses. TABLE 3 lists some examples of the results which can be obtained:

TABLE 3

| WORD | AVERAGE POSITIVITY | AVERAGE NEGATIVITY | AVERAGE OBJECTIVITY |
|---|---|---|---|
| pale-hued | 0 | 0 | 1 |
| apractic | 0.125 | 0.625 | 0.25 |
| disclosed | 0.25 | 0 | 0.75 |
| fatherlike | 0.375 | 0 | 0.625 |
| purplish | 0 | 0 | 1 |
| Viennese | 0 | 0 | 1 |
| overindulgent | 0.125 | 0.25 | 0.625 |
| ... | ... | ... | ... |

These examples are not taken from the exemplary polar vocabulary. This filtering resource tends to flatten the semantic ambiguity, therefore it may be used, for example, only to filter out the adjectives which are considered as mostly objective (i.e., average objectivity>0.75), e.g. "electrical," "medical," ..., and to detect the potential erroneous cases where a mostly positive term according to SentiWordnet (average positivity>0.75) has a negative distance Dist(A) in the method and the cases where a mostly negative term according to SentiWordnet (Average negativity>0.75) has a positive distance in the method.

In the example, from the initial set of 628 candidates polar adjectives, 128 adjectives were filtered out as being objective, according to SentiWordnet, and 9 adjectives corrected, i.e., their polarity was inverted. The result is an ordered list of 500 adjectives.

The list may be manually evaluated (taking the review's domain and context into account), which is relatively straightforward, due to the ordering of the list.

Based on a human review, a 76.2% precision in the classification of the adjectives' polarity was obtained. The errors (23.8%) can be assigned to the following: 7.8% are objective type adjectives which have not been detected by the SentiWordNet filter, 11.2% are wrongly considered as positive instead of negative, and 4.8% are wrongly considered as negative instead of positive.

Example 2

Evaluation of the Polar Vocabulary in an Opinion Review Assistant

An authoring assistant 1 was used to evaluate the impact of the discovered list of polar adjectives, by including them in a polar vocabulary 38 employed by the parser. The system uses the XIP parser to detect opinion expressions from semantic relations extracted from the user's comments and attach a polarity to each instance. An example of the output on the dedicated interface 112 is analogous to that shown in FIG. 4, where the pie chart 124 summarizes the percentage of positive opinions and negative opinions found in the document (which are shown in red and blue, respectively). The text in the review analysis 120 can be similarly colored red and blue to indicate which relations contributed to the effective opinion overall.

The Epinions™ reviews are structured in that at the end of each review, the user has to explicitly indicate if he or she recommends the product or not. Using this information, the test corpus is filtered in two sub corpora: one containing the recommended products, and the other containing the not recommended products. Setting the threshold of positive opinion instances at 50%, then if a review recommends a product, the system should extract more than 50% of positive opinions relations and if a review do not recommend a product, the system should extract more than 50% negative opinion relations.

From 3730 customer reviews about printer products from the Epinions™ website, about 400 reviews are used to develop the system, and about 3330 are used to evaluate it. In the test corpus of 3337 reviews obtained from the Epinions website, 2517 reviews do recommend the product and 820 do not recommend the product.

The system was used to classify these reviews. In order to evaluate the impact of the learned polar adjectives, two experiments were performed, one including the polar adjectives in the parser lexicon and the other not, using exactly the same sentiment grammar. The results shown in TABLES 4 and 5 were obtained.

TABLE 4

Experiment without learned adjectives:

| | RECOMMENDED PRODUCT REVIEWS | NOT RECOMMENDED PRODUCT REVIEWS | TOTAL REVIEWS |
|---|---|---|---|
| Number | 2517 | 820 | 3337 |
| Classified as positive by the system (≥50% positive opinions) | 2414 | 263 | 2677 |
| Classified as negative by the system (>50% negative opinions) | 103 | 558 | 661 |
| System accuracy | 96% | 68% | 89% |

TABLE 5

Experiment including learned adjectives

| | RECOMMENDED PRODUCT REVIEWS | NOT RECOMMENDED PRODUCT REVIEWS | TOTAL REVIEWS |
|---|---|---|---|
| Number | 2517 | 820 | 3337 |
| Classified as positive by the system (>=50% positive opinions) | 2440 | 218 | 2658 |
| Classified as negative by the system (>50% negative opinions) | 77 | 602 | 679 |
| System accuracy | 97% | 73.4% | 91% |

There is a global increase of 2% on the total accuracy of the system, and a significant improvement of the accuracy on the "not recommended" reviews.

Example 3

Detection of Incoherent Reviews for an Authoring Assistant

From 3730 customer reviews about printer products from the Epinions website, about 400 reviews are used to develop the system, and about 3330 are used to evaluate it. While studying this corpus, it appears that sometimes (about 2% of the reviews in this particular case), the rating or recommendation given by the author is incoherent with the content of the review (e.g., of the type illustrated in FIG. 2).

The system provides useful results. In particular, it detects incoherent reviews. For example, in one 4 star review, the opinion review component extracts 63% of negative opinions and only 37% of positive opinions from it, which shows a clear discrepancy between the rating and the content. Looking at the reviews in the test corpus, there are about 2% of incoherent reviews (67 reviews where there is a mismatch between the rating and the content or between the rating and the recommendation). The system detects a discrepancy on 54 of these reviews, which corresponds to 80.6% accuracy.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An authoring assistant comprising:
   memory which stores a polar vocabulary in which a polarity measure is associated with each of a set of adjectival terms, the polarity measure being based on ratings of reviews in a corpus of reviews from which the respective adjectival term was extracted;
   a parser which identifies opinion expressions in an input text;
   an opinion review component which generates an analysis of the text based on the identified opinion expressions, the opinion review component computing an effective opinion of the text as a function of a measure of polarity associated with the identified opinion expressions, which is based on the polarity measure associated with respective adjectival terms from the polar vocabulary that are in the opinion expressions, the opinion review component comprising a comparator component which compares the effective opinion with a rating associated with the text to determine whether the text and the rating are coherent;
   a synonym generator for identifying synonyms of terms of identified opinion expressions;
   a representation generator which generates a representation of the analysis for display on an associated user interface, the representation of the analysis including a representation of the effective opinion, the representation generator displaying at least one synonym of one of the terms in an identified opinion expression when the effective opinion and the rating associated with the text are incoherent; and
   a processor which implements the opinion review component and representation generator.

2. The authoring assistant of claim 1, further comprising a warning component which outputs a warning when the effective opinion and rating are incoherent.

3. The authoring assistant of claim 1, wherein the text and rating are extracted from an author's review of an item.

4. The authoring assistant of claim 1, further comprising a display device for displaying the representation.

5. The authoring assistant of claim 1, wherein in the representation, each of the identified opinion expressions is identified.

6. The authoring assistant of claim 1, further comprising a user interface which displays the representation and provides for an author to modify the text after the representation has been displayed.

7. The authoring assistant of claim 1, wherein the polarity measure is selected from a negative polarity and a positive polarity.

8. The authoring assistant of claim 1, wherein in the representation, the effective opinion is graphically represented.

9. The authoring assistant of claim 1, wherein at least some of the opinion expressions identifiable by the parser include a semantic relation between a first text element and a second text element, wherein at least one of the text elements is associated with a respective polarity measure.

10. An authoring assistant comprising:
    memory which stores a polar vocabulary in which a polarity measure is associated with each of a set of adjectival terms, the polarity measure being based on ratings of reviews in a corpus of reviews from which the respective adjectival term was extracted;
    a parser which identifies opinion expressions in text of an input author's review of an item, the review including the author's rating of the item on a predefined scale;
    an opinion review component which generates an analysis of the text of the author's review based on the identified opinion expressions, the opinion review component computing an effective opinion of the text as a function of a measure of polarity associated with the identified opinion expressions, which is based on the polarity measure associated with respective adjectival terms from the polar vocabulary that are in the opinion expressions, the opinion review component comprising a comparator component which compares the effective opinion with the author's rating associated with the text to determine whether the text and the author's rating of the item are coherent;
    a representation generator which generates a representation of the analysis for display on an associated user interface, the representation of the analysis including a representation of the effective opinion;
    a warning component which outputs a warning when the effective opinion and author's rating are incoherent; and
    a processor which implements the opinion review component and representation generator.

11. The authoring assistant of claim 10, further comprising a synonym generator for identifying synonyms of terms of identified opinion expressions, the representation generator displaying at least one synonym of one of the terms in an identified opinion expression when the effective opinion and the rating associated with the text are incoherent.

12. A method for assisting an author, comprising:
    receiving an author's review of an item which includes text and an associated author's rating of the item on a predefined scale;
    parsing the text of the author's review of the item to identify opinion expressions in the input text;
    with a processor, generating an analysis of the text, based on the identified opinion expressions including computing an effective opinion of the text as a function of a measure of polarity associated with each of the identified opinion expressions, the measure of polarity being is based on the polarity measure associated with respective adjectival terms from a polar vocabulary that are in the opinion expressions, the polar vocabulary associating a polarity measure with each of a set of adjectival terms, the polarity measure being based on ratings of reviews in a corpus of reviews from which the respective adjectival term was extracted;

comparing the effective opinion with the author's rating to determine whether the text and the author's rating are coherent; and generating a representation of the analysis for display on a user interface, the representation of the analysis including a representation of the effective opinion.

13. The method of claim 12, further comprising displaying the representation of the user interface and providing for an author to modify the text after the representation has been displayed.

14. The method of claim 12, further comprising outputting a warning when the effective opinion and rating are incoherent.

15. The method of claim 12, further comprising providing for identifying synonyms of terms of identified opinion expressions and for displaying at least one synonym of one of the terms in an identified opinion expression.

16. The method of claim 15, further comprising displaying at least one identified synonym of one of the terms in an identified opinion expression when the effective opinion and the rating associated with the text are incoherent.

17. The method of claim 12, wherein in the representation, each of the identified opinion expressions is identified.

18. The method of claim 12, further comprising storing the polar vocabulary comprising the set of polar terms in memory, each polar term in the polar vocabulary being associated with a polarity measure, the measure of polarity associated with at least some of the identified opinion expressions being based on the polarity measure of one of the polar terms which is present in the opinion expression.

19. The method of claim 18, further comprising acquiring a set of polar adjectival terms from a corpus of reviews, each of the reviews in the corpus including text and an associated rating provided by the author of the review and incorporating the polar adjectives into the polar vocabulary.

20. The method of claim 19, wherein the acquiring of the set of polar adjectival terms comprises:

extracting textual content from reviews in the corpus of reviews;

identifying a set of frequent nouns from the textual content of the reviews;

extracting adjectival terms from the textual content of the reviews, each adjectival term being associated in the textual content with one of the frequent nouns; and generating the set of polar adjectival terms including at least some of the extracted adjectival terms, a polarity measure being associated with each adjectival term in the set which is based on the ratings of the reviews from which the adjectival term was extracted.

21. The method of claim 18, wherein when an opinion expression is identified as a negated opinion expression, the polarity measure of the polar term is modified.

22. The method of claim 12, wherein the polarity measure associated with polar terms in the polar vocabulary is selected from a negative polarity and a positive polarity.

23. The method of claim 12, wherein in the representation, the effective opinion is graphically represented.

24. The method of claim 12, wherein the extraction of the opinion expressions includes applying parser rules for identifying a semantic relation between a first text element and a second text element, wherein at least one of the text elements is associated with a polarity measure upon which the measure of polarity of the opinion expression is based.

25. A system for performing the method of claim 12 comprising memory which stores instructions for performing the method and a processor in communication with the memory for executing the instructions.

26. A computer program product comprising a non-transitory recording medium encoding instructions, which when executed on a computer causes the computer to perform the method of claim 12.

27. A method comprising:

extracting textual content from reviews in a corpus of reviews, each of the reviews including a rating on a predefined scale by the author of the textual content;

identifying a set of frequent nouns from the textual content of the reviews;

extracting adjectival terms from the textual content of the reviews, each adjectival term being associated in the textual content with one of the frequent nouns;

generating a polar vocabulary which includes at least some of the extracted adjectival terms, a measure of polarity being associated with each adjectival term in the polar vocabulary which is based on the ratings of the reviews from which the adjectival term was extracted;

providing for parsing an input text to identify opinion expressions in the input text;

with a processor, providing for generating an analysis of the text, based on the identified opinion expressions including computing an effective opinion of the text as a function of a measure of polarity associated with each of the identified opinion expressions which is based on the measure of polarity associated with respective adjectival terms from the polar vocabulary that are in the opinion expressions; and generating a representation of the analysis for display on a user interface, the representation of the analysis including a representation of the effective opinion.

28. The method of claim 27, wherein the generating of the polar vocabulary comprises identifying a set of positive reviews and a set of negative reviews, based on the ratings, and computing, for an identified adjectival term, a measure of its occurrence in the positive and negative sets of reviews, the polarity measure of the term being based on the measure of occurrence.

* * * * *